(12) United States Patent
Lemmons

(10) Patent No.: US 8,749,798 B2
(45) Date of Patent: Jun. 10, 2014

(54) METHODS AND SYSTEMS FOR MEASURING OPENINGS USING PHOTOGRAMMETRY

(75) Inventor: Clayton Wyatt Lemmons, Bothell, WA (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 13/086,929

(22) Filed: Apr. 14, 2011

(65) Prior Publication Data

US 2012/0262732 A1 Oct. 18, 2012

(51) Int. Cl.
*G01B 11/00* (2006.01)

(52) U.S. Cl.
USPC .......................................... 356/626; 356/622

(58) Field of Classification Search
USPC .............................. 356/626, 622, 241.3, 241.1
See application file for complete search history.

(56) References Cited

U.S. PATENT DOCUMENTS

| | | | | | |
|---|---|---|---|---|---|
| 2,274,275 | A | * | 2/1942 | Phillips | 33/542 |
| 2,973,583 | A | * | 3/1961 | Stolle et al. | 33/544.3 |
| 2,994,962 | A | * | 8/1961 | Lebourg | 33/544.3 |
| 3,188,739 | A | * | 6/1965 | Olsen et al. | 33/275 R |
| 3,624,684 | A | * | 11/1971 | McCaslin | 33/124 |
| 3,821,856 | A | * | 7/1974 | Rapp | 33/544.2 |
| 4,160,329 | A | * | 7/1979 | Scrimshaw | 33/555.1 |
| 4,288,924 | A | * | 9/1981 | Mizuno et al. | 33/794 |
| 4,438,566 | A | * | 3/1984 | Sakata et al. | 33/544.5 |
| 4,447,962 | A | * | 5/1984 | Grosberg | 33/286 |
| 4,549,360 | A | * | 10/1985 | Allen | 33/293 |
| 4,562,648 | A | * | 1/1986 | Danielli | 324/318 |
| 4,722,142 | A | * | 2/1988 | Schmidt | 33/834 |
| 5,088,207 | A | * | 2/1992 | Betsill et al. | 33/555.3 |
| 5,119,564 | A | * | 6/1992 | Hamilton et al. | 33/293 |
| 5,572,798 | A | * | 11/1996 | Barnaby | 33/549 |
| 6,065,220 | A | * | 5/2000 | Ohtsuka et al. | 33/549 |
| 6,330,753 | B1 | | 12/2001 | Li | |
| 6,490,805 | B1 | * | 12/2002 | Couture et al. | 33/542 |
| 6,634,114 | B2 | * | 10/2003 | Bidwell | 33/542 |
| 6,813,840 | B1 | * | 11/2004 | Delmas et al. | 33/293 |
| 7,698,826 | B2 | * | 4/2010 | Hubbs | 33/293 |
| 7,783,376 | B2 | | 8/2010 | Marsh et al. | |
| 7,884,951 | B2 | * | 2/2011 | Prouvost et al. | 356/626 |
| 7,913,405 | B2 | * | 3/2011 | Berg et al. | 33/293 |
| 2008/0192371 | A1 | * | 8/2008 | Hubbs | 359/883 |
| 2010/0114521 | A1 | | 5/2010 | Piasse et al. | |
| 2011/0271541 | A1 | * | 11/2011 | Huang | 33/827 |

FOREIGN PATENT DOCUMENTS

GB 2436618 A 10/2007

OTHER PUBLICATIONS

Extended European Search Report for Application No. 12164161; Jul. 24, 2013; 6 pages.
Canadian Office Action for Application No. 2765681; Nov. 28, 2013; 2 pages.

* cited by examiner

*Primary Examiner* — Roy M Punnoose
(74) *Attorney, Agent, or Firm* — Armstrong Teasdale LLP

(57) ABSTRACT

Method and system for measuring an opening at least partially defined by a surface. A plurality of target bodies are positioned about a circumference of a target body holder that is sized to fit within the opening. The target bodies are forced radially outward to cause at least one of the target bodies to be positioned against the surface. A geometric property of the opening is determined based at least partially on a location of at least one of the target bodies positioned against the surface.

20 Claims, 5 Drawing Sheets

METHODS AND SYSTEMS FOR MEASURING OPENINGS USING PHOTOGRAMMETRY

BACKGROUND

The present disclosure relates generally to measurement systems and, more particularly, to methods and systems for measuring an opening using photogrammetry.

A variety of methods and systems have been used to measure openings. Under one known method, technicians apply hot glue and steel sphere targets into each of the 1,500 openings of a section of a 787 fuselage. Two expensive laser radar systems are then utilized to measure the 1,500 steel sphere targets in 17 to 24 hours. Subsequently, several hours are needed to remove the hot glue and each of the steel spheres. The entire measurement process is time-consuming, expensive, and labor intensive.

At least some other known measurement systems use simple, flanged, cylindrical devices that are sized to fit snugly within an opening having a predetermined-size. As such, in such systems, each cylindrical device is selected based on a size of the opening to be measured. Accordingly, a plurality of measurement devices of various sizes are required to measure a plurality of different-sized openings.

BRIEF DESCRIPTION

In one aspect, a method is provided for measuring an opening at least partially defined by a surface. The method includes positioning a plurality of target bodies about a circumference of a target body holder that is sized to fit within the opening. The target bodies are forced radially outward to cause at least one of the target bodies to be positioned against the surface. A geometric property of the opening is determined based at least partially on a location of at least one of the target bodies positioned against the surface.

In another aspect, a target body holder is provided for use in measuring an opening at least partially defined by a surface. The target body holder includes a head portion and a shaft portion extending from the head portion. The shaft portion is sized to fit within the opening. An expanding mechanism is configured to force the target bodies radially outward to cause at least one of the target bodies to be positioned against the surface.

In yet another aspect, a system is provided for use in measuring an opening at least partially defined by a surface. The system includes a plurality of target bodies and a target body holder sized to fit within the opening. The target body holder is configured to force the target bodies radially outward to cause at least one of the target bodies to be positioned against the surface. A modeling device is programmed to determine a geometric property of the opening based at least partially on a location of at least one of the target bodies.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of a drawing may be referenced and/or claimed in combination with any feature of any other drawing.

DETAILED DESCRIPTION

The subject matter described herein relates generally to a measurement system and, more particularly, to methods and systems for use in measuring an opening using photogrammetry. In one embodiment, a plurality of target bodies are positioned about a circumference of a target body holder that is sized to fit within the opening. In such an embodiment, the target bodies are forced radially outward to cause at least one of the target bodies to be positioned against a surface that at least partially defines the opening. When the target body holder is in such a position, a geometric property of the opening may be determined based at least partially on a location of at least one of the target bodies. As used herein, the term "geometric property" may refer to any geometric parameter used to quantify a geometric shape including, without limitation, an arc, a chord, a diameter, a radius, a circumference, a center, a centerline, an area, a sector, and/or a segment.

An element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
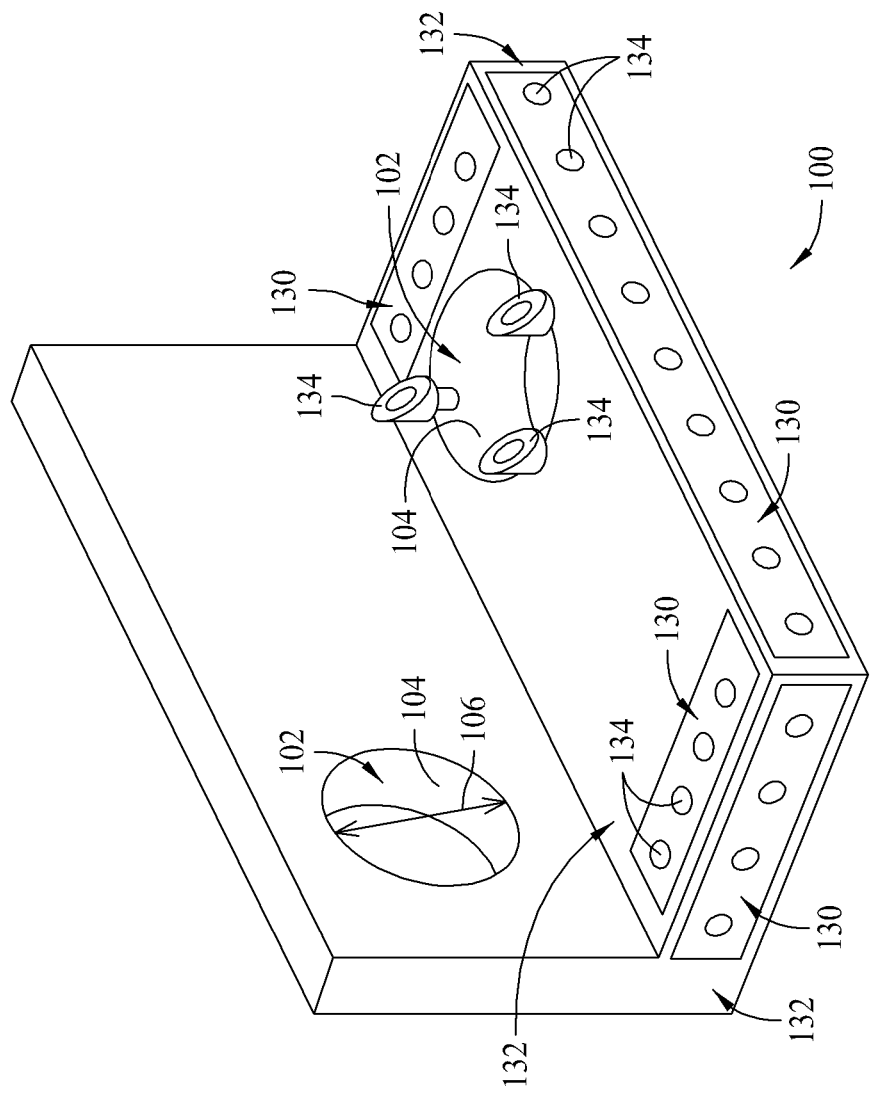
FIG. 1 is a perspective view of an exemplary measurement system.

FIG. 1 is a perspective view of an exemplary measurement system 100 that may be used to determine at least one geometric property of an opening 102 that is at least partially defined by a surface 104. That is, in the exemplary embodiment, surface 104 is an interior bore surface of opening 102. In the exemplary embodiment, opening 102 has a predetermined diameter 106.

In the exemplary embodiment, measurement system 100 includes a target body holder 110 (shown in FIG. 2), a plurality of target bodies 120 (shown in FIG. 2) positioned about a circumference of target body holder 110, and a plurality of strips 130 that enable a base reference to be determined between opening 102 and a wall 132 positioned adjacent to opening 102. In the exemplary embodiment, strips 130 extend across at least a portion of wall 132. Alternatively, strips 130 may extend across any surface that enables measurement system 100 to function as described herein.

In the exemplary embodiment, at least one target 134 is coupled to each target body 120 and strip 130. Each target 134 is detectable by a modeling device, described in more detail below. For example, in the exemplary embodiment, targets 134 are photogrammetry targets. Alternatively, targets 134 may be, without limitation, theodolite targets, retro reflective tape targets, probing targets, laser tracking targets, and/or laser projecting targets positioned at any suitable location that would enable measurement system 100 to function as described herein.

Figure 2:
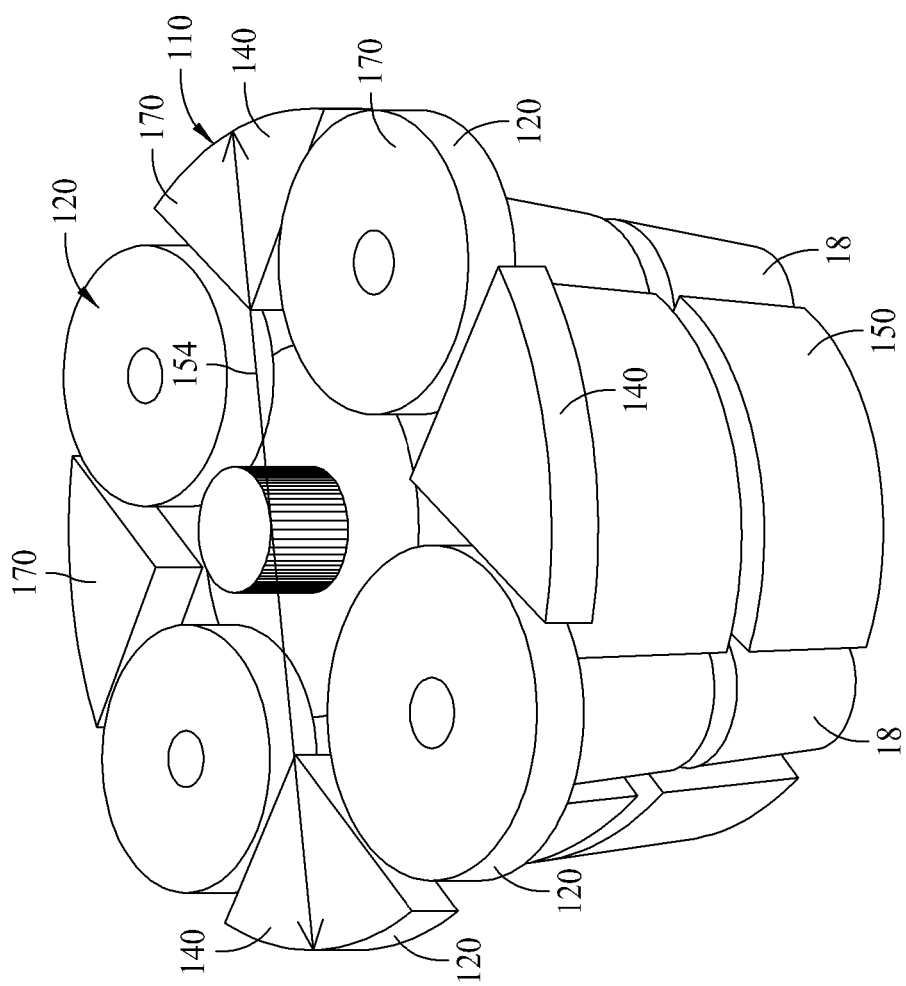
FIG. 2 is a top perspective view of a target body system that may be used with the measurement system shown in FIG. 1.
Figure 3:
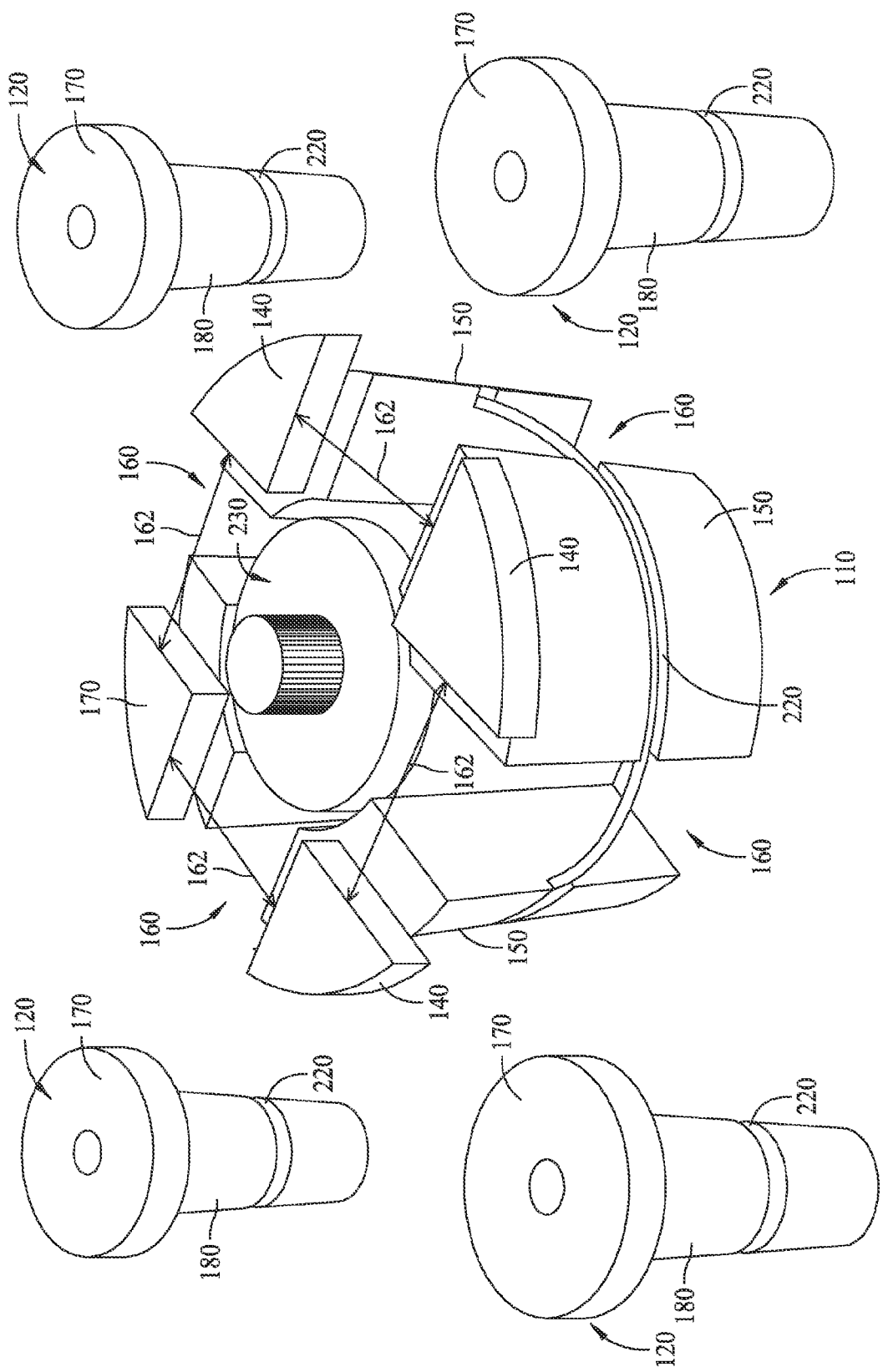
FIG. 3 is an exploded view of the target body system shown in FIG. 2.

As shown in FIGS. 2 and 3, target body holder 110 includes a head portion 140 and a shaft portion 150 that extends from head portion 140. In the exemplary embodiment, shaft portion 150 has a diameter 152 (shown in FIG. 4) that is sized to fit within opening 102, and head portion 140 has a diameter 154 that is sized to prevent target body holder 110 from falling through opening 102. That is, in the exemplary embodiment, diameter 152 of shaft portion 150 is smaller than diameter 106 of opening 102, and diameter 154 of head portion 140 is larger than diameter 106 of opening 102.

In the exemplary embodiment, target body holder 110 includes a plurality of recesses 160 defined therein that are each sized to receive target bodies 120 therein. More specifically, in the exemplary embodiment, each recess 160 has a width 162 that is sized to receive a corresponding target body 120. In the exemplary embodiment, recesses 160 are spaced approximately equidistantly about a circumference of target body holder 110. More specifically, in the exemplary embodiment, recesses 160 are aligned such that a line drawn between diametrically opposite recesses 160 extends through the center of head portion 140.

In the exemplary embodiment, each target body 120 includes a head portion 170 and a shaft portion 180 that extends from head portion 170. In the exemplary embodiment, shaft portion 180 has a diameter 182 (shown in FIG. 4) that is sized to fit within recess 160, and head portion 170 has a diameter 184 (shown in FIG. 4) that is sized to prevent target body 120 from falling through recess 160. That is, in the exemplary embodiment, diameter 182 of shaft portion 180 is smaller than width 162 of recess 160, and diameter 184 of head portion 170 is larger than width 162 of recess 160. More specifically, in the exemplary embodiment, recess 160 is a countersink sized to enable head portion 170 of target body 120 to be positioned substantially flush with, or below, a surface of target body holder 110. As such, when target body 120 is positioned within recess 160, head portions 140 and 170 are substantially coplanar.

Figure 4:
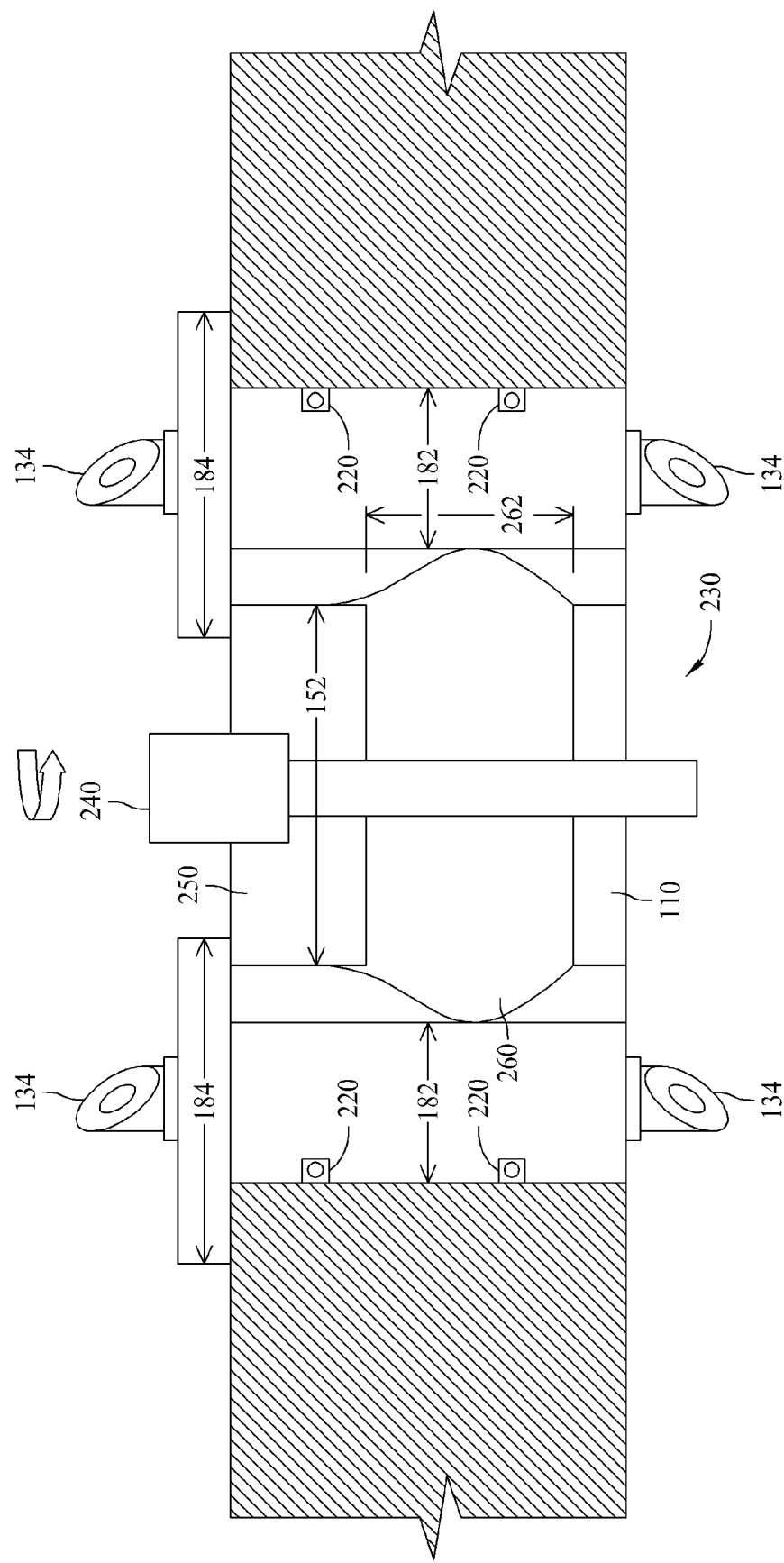
FIG. 4 is a cross-sectional view of the target body system shown in FIG. 2.

FIG. 4 is a cross-sectional view of the target body system shown in FIGS. 2 and 3 positioned within opening 102. In the exemplary embodiment, at least one retaining member 210 extends about target body holder 110 and target bodies 120 to facilitate maintaining target body holder 110 and/or target bodies 120 radially in place with respect to target body holder 110 and/or target bodies 120. In the exemplary embodiment, target body holder 110 and/or target bodies 120 include a groove 220 defined therein that facilitates axially maintaining retaining member 210 with respect to target body holder 110 and/or target bodies 120.

In the exemplary embodiment, target body holder 110 includes an expanding mechanism 230 that enables target bodies 120 to be positioned against surface 104. In the exemplary embodiment, expanding mechanism 230 includes at least a clamp screw 240, a clamp washer 250, and a rubber pressure ring 260 positioned generally between clamp washer 250 and a portion of target body holder 110. As such, in the exemplary embodiment, clamp screw 240 is used to selectively increase or decrease an axial distance 262 between clamp washer 250 and the portion of target body holder 110. More specifically, as clamp screw 240 is rotated in a first direction, axial distance 262 decreases longitudinally causing rubber pressure ring 260 to expand radially outward. Conversely, as clamp screw 240 is rotated in an opposite second direction, axial distance 262 increases longitudinally causing rubber pressure ring 260 to contract radially. Alternatively, any suitable expanding mechanism 230 that would enable measurement system 100 to function as described herein may be used. For example, in one embodiment, a spring loaded system may be used to selectively move target bodies 120 radially outward.

During operation, in the exemplary embodiment, targets 134 are detected by a modeling device, described in more detail below, to facilitate determining a geometric property of opening 102. In the exemplary embodiment, measurement system 100 is positioned at least partially within opening 102. In the exemplary embodiment, expanding mechanism 230 is selectively actuated to move target bodies 120 radially outward with respect tot target body holder 110 such that at least one target body 120 is positioned against surface 104. As described in more detail below, at least one photograph is taken to simultaneously capture a location of targets 134 disposed on target bodies 120 and/or strips 130 to determine a geometric property of opening 102 based at least partially on a location of target body 120.

In the exemplary embodiment, a best fit circle is projected based on a location of at least three targets 134. That is, given a location of at least three targets 134, a circle representative of opening may be accurately projected. Additionally or alternatively, a line may be projected between pairs of targets 134 positioned on opposite sides of target body holder head portion 140, and the radial center of opening 102 may be determined based at least partially on a midpoint of the line. Alternatively, a second line may be projected between a second pair of targets 134 positioned on opposite sides of target body holder head position 140, and the radial center of opening 102 may be determined based at least partially on an intersection of the lines.

Additionally or alternatively, a second measurement system 100 may be positioned at an opposite end of opening 102 to determine additional geometric properties of opening 102. For example, a radial center may be determined for each end of opening 102, and a centerline may be projected between the radial centers for each end of opening 102. Moreover, a midpoint of the centerline may be determined based at least partially on the radial centers for each end of opening 102. Furthermore, a position of opening 102 may be determined relative to wall 132 based at least partially on a location of target bodies 120 with respect to strips 130. In the exemplary embodiment, a location of targets 134 is simultaneously captured by capturing at least one photographic image of targets 134 that is transmitted to a modeling device.

Figure 5:
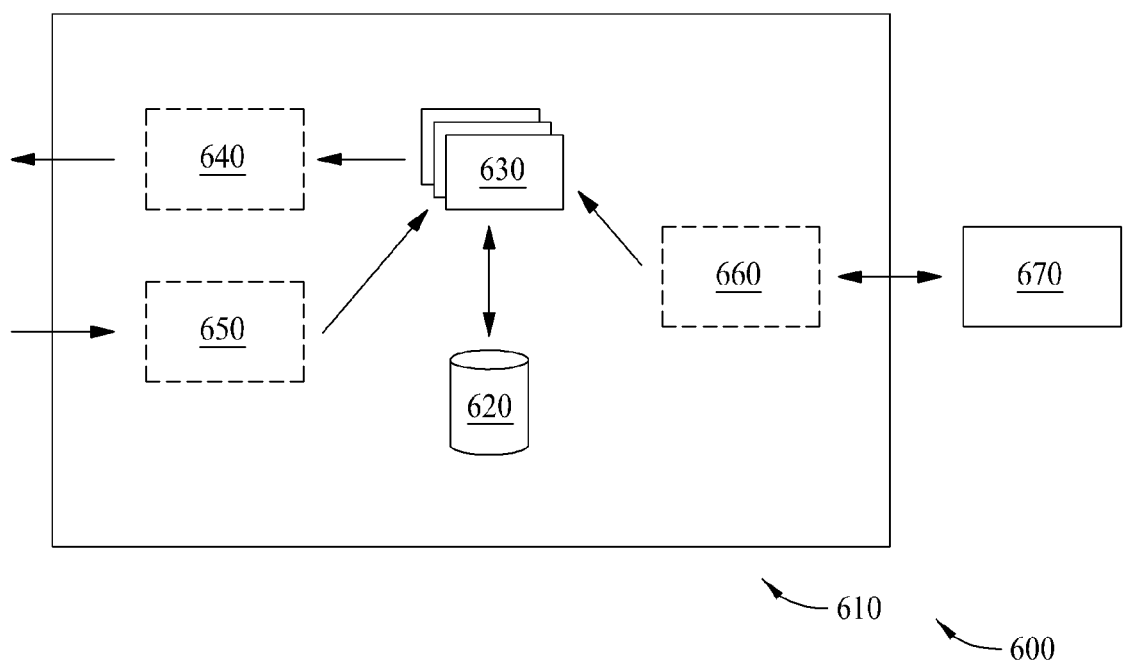
FIG. 5 is a schematic illustration of an exemplary modeling device that may be used with the measurement system shown in FIG. 1.

FIG. 5 illustrates an exemplary modeling device 600 including an exemplary computing system 610 that may be used to determine a geometric property of opening 102. In the exemplary embodiment, computing system 610 includes a memory device 620 and a processor 630 coupled to memory device 620 for use in executing instructions. In the exemplary embodiment, computing system 610 is configurable to perform one or more operations described herein by programming memory device 620 and/or processor 630. For example, processor 630 may be programmed by encoding an operation as one or more executable instructions and by providing the executable instructions in memory device 620.

Processor 630 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 620 includes one or more devices (not shown) that enable information such as executable instructions and/or other data to be selectively stored and retrieved. In the exemplary embodiment, such data may include, but is not limited to, geometric property data, photogrammetry data, modeling data, and/or environmental data. Memory device 620 may also include one or more computer readable media, such as, without limitation, dynamic random access memory (DRAM), static random access memory (SRAM), a solid state disk, and/or a hard disk.

In the exemplary embodiment, computing system 610 includes a presentation interface 640 that is coupled to processor 630 for use in presenting information to a user. For example, presentation interface 640 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 640 includes one or more display devices.

Computing system 610, in the exemplary embodiment, includes an input interface 650 for receiving input from the user. For example, in the exemplary embodiment, input interface 650 receives information suitable for use with the methods described herein. Input interface 650 is coupled to processor 630 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 640 and as input interface 650.

In the exemplary embodiment, computing system 610 includes a communication interface 660 that is coupled to processor 630. In the exemplary embodiment, communication interface 660 communicates with a remote device (not shown). For example, communication interface 660 may use, without limitation, a wired network adapter, a wireless network adapter, and/or a mobile telecommunications adapter. A network (not shown) used to couple computing system 610 to the remote device may include, without limitation, the Internet, a local area network (LAN), a wide area network (WAN), a wireless LAN (WLAN), a mesh network, and/or a virtual private network (VPN) or other suitable communication means.

In the exemplary embodiment, computing system 610 is coupled to a sensor 670 via communication interface 660. In the exemplary embodiment, sensor 670 is configured to simultaneously capture a location of targets 134 by taking at least one photographic image of targets 134.

The above-described embodiments facilitate accurately and/or efficiently measuring an opening. The embodiments described herein are adaptable to fit various-sized openings and, thus, the systems described herein are versatile and/or cost-efficient. Moreover, the embodiments described herein facilitate ensuring a suitable fit within the opening to produce a measurement that is time-efficient, accurate, and repeatable. Accordingly, the measurement system described herein enables at least one geometric property of the opening to be obtained in a cost-effective and reliable manner.

Exemplary embodiments of systems and methods for determining a geometric property of an opening are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of measuring an opening at least partially defined by a surface, said method comprising:
    positioning a plurality of target bodies about a circumference of a target body holder that is sized to fit within the opening;
    forcing the plurality of target bodies radially outward to cause at least one of the plurality of target bodies to be positioned between the surface and a shaft portion of the target body holder; and
    determining a geometric property of the opening based at least partially on a location of at least one of the plurality of target bodies positioned against the surface.

2. A method in accordance with claim 1 wherein determining a geometric property of the opening further comprises projecting a circle based on a position on at least three of the plurality of target bodies.

3. A method in accordance with claim 1 wherein determining a geometric property of the opening further comprises;
    projecting a line to extend between a pair of the plurality of target bodies; and
    determining a center of the opening based at least partially on the line.

4. A method in accordance with claim 1 wherein determining a geometric property of the opening further comprises:
    projecting a first line to extend between a first pair of the plurality of target bodies;
    projecting a second line to extend between a second pair of the plurality of target bodies; and
    determining a center of the opening based at least partially on the first and second lines.

5. A method in accordance with claim 1 further comprising:
    positioning the plurality of target bodies at a second end of the opening;
    forcing the plurality of target bodies radially outward to cause at least one of the plurality of target bodies to be positioned against the surface; and
    determining a second geometric property of the opening based at least partially on a second location of at least one of the plurality of target bodies and the geometric property.

6. A method in accordance with claim 1 further comprising:
    determining a position of a surface adjacent to the opening; and
    determining a position of the opening relative to the surface.

7. A target body holder for use in measuring an opening at least partially defined by a surface using a plurality of target bodies, said target body holder comprising:
    a head portion;
    a shaft portion extending said head portion, wherein said shaft portion is sized to fit within the opening; and an expanding mechanism configured to force the plurality of target bodies radially outward to cause at least one of the plurality of target bodies to be positioned between the surface and said shaft portion.

8. A target body holder in accordance with claim 7, wherein said head portion has a plurality of recesses spaced about a circumference of said target body holder, said plurality of recesses sized such that each of the plurality of target bodies is positionable within a corresponding recess of the plurality of recesses.

9. A target body holder in accordance with claim 8, wherein the plurality of recesses are spaced evenly about the circumference of said target body holder.

10. A system for use in measuring an opening at least partially defined by a surface, said system comprising:
  a plurality of target bodies;
  a target body holder sized to fit within the opening, said target body holder configured to force said plurality of target bodies radially outward to cause at least one of said plurality of target bodies to be positioned against the surface; and
  a modeling device programmed to determine a geometric property of the opening based at least partially on a location of at least one of said plurality of target bodies.

11. A system in accordance with claim 10, wherein said target body holder has a head portion and a shaft portion extending from said head portion, wherein said shaft portion is sized to fit within the opening.

12. A system in accordance with claim 10, wherein said target body holder has a plurality of recesses spaced about a circumference of said target body holder, said plurality of recesses sized such that each of said plurality of target bodies is positionable within a corresponding recess of the plurality of recesses.

13. A system in accordance with claim 12, wherein each of said plurality of target bodies has a head portion and a shaft portion extending from said head portion, wherein said shaft portion is sized to fit within the corresponding recess.

14. A system in accordance with claim 12, wherein the plurality of recesses are spaced evenly about the circumference of said target body holder.

15. A system in accordance with claim 10 wherein said modeling device is further programmed to fit a circle based on a position on at least three of the plurality of target bodies.

16. A system in accordance with claim 10 wherein said modeling device is further programmed to project a line extending between a pair of said plurality of target bodies and determine a center of the opening based at least partially on the line.

17. A system in accordance with claim 10 wherein said modeling device is further programmed to project a first line extending between a first pair of said plurality of target bodies, project a second line extending between a second pair of said plurality of target bodies, and determine a center of the opening based at least partially on the first line and the second line.

18. A system in accordance with claim 10 further comprising:
  a second plurality of target bodies; and
  a second target body holder sized to fit within the opening, said second target body holder configured to force said second plurality of target bodies radially outward at a second end of the opening to cause at least one of said second plurality of target bodies to be positioned against the surface, wherein said modeling device is further programmed to determine a second geometric property of the opening based at least partially on a location of at least one of said second plurality of target bodies and the geometric property.

19. A system in accordance with claim 10 further comprising a plurality of strips that are positioned on a surface adjacent to the opening, wherein said modeling device is further programmed to determine a position of the opening relative to the surface based at least partially on a location of said plurality of strips, 20. A. system in accordance with claim 10, wherein said target body holder further comprises an expanding mechanism.

* * * * *